United States Patent [19]

Calvert

[11] 4,357,186
[45] Nov. 2, 1982

[54] MACHINE AND METHOD FOR FORMING AND APPLYING CARRYING STRAPS TO ARTICLE CARTONS

[75] Inventor: Rodney K. Calvert, Dunwoody, Ga.

[73] Assignee: The Mead Corporation, Dayton, Ohio

[21] Appl. No.: 160,222

[22] Filed: Jun. 17, 1980

[51] Int. Cl.³ .............................................. B32B 31/16
[52] U.S. Cl. .................................. 156/73.1; 156/218; 156/443; 156/256; 156/510; 156/580.1
[58] Field of Search .................. 493/303, 462; 53/582, 53/585, 589, 588, 510, 443, 256, 8; 156/73.1, 218, 157, 304.6; 140/102; 72/298; 100/27, 33 PB; 83/208

[56] References Cited

U.S. PATENT DOCUMENTS

| | | | |
|---|---|---|---|
| 1,258,941 | 3/1918 | Packer | 493/303 X |
| 1,650,844 | 11/1927 | McChesney | 53/589 X |
| 2,134,914 | 11/1938 | Frame | 493/303 |
| 3,003,297 | 10/1961 | Broadhead | 100/27 |
| 3,177,749 | 4/1965 | Best | 83/208 |
| 3,195,583 | 7/1965 | Jones | 140/102 |
| 3,406,601 | 10/1968 | Clifford | 83/208 |
| 3,489,076 | 1/1970 | Countryman | 53/589 |
| 3,665,845 | 5/1972 | Lyon | 53/589 X |
| 4,062,278 | 12/1977 | Cheung | 100/33 PB |
| 4,079,667 | 3/1978 | Lems | 100/26 X |
| 4,248,414 | 2/1981 | Rovin | 493/462 |
| 4,265,687 | 5/1981 | Mercer | 53/589 |

Primary Examiner—John Sipos
Attorney, Agent, or Firm—Rodgers & Rodgers

[57] ABSTRACT

A machine for forming and applying carrying straps to cartons includes strip measuring means for supplying a strip of predetermined length from a supply of strip material, strip looping means for receiving said strip from said strip measuring means and for gripping said strip near the leading end thereof, motive means for rotating said strip looping means in a direction such that the trailing end of said strip overlaps said leading end thereof, holding means for engaging and holding said overlapping ends in face contacting relation, means for severing said strip at the trailing end thereof from said supply of strip material, securing means for attaching said overlapped ends of said strip together to form an endless strap, means for applying said strap in enveloping relation to at least some articles of a group of articles to be packaged, means for inserting said group of articles into an open ended sleeve type carton having end flaps at least some of which are apertured to expose a part of said strap, means for closing said end flaps, and means for securing said end flaps in closed condition.

11 Claims, 8 Drawing Figures

Fig_5

Fig_7

MACHINE AND METHOD FOR FORMING AND APPLYING CARRYING STRAPS TO ARTICLE CARTONS

TECHNICAL FIELD

This invention relates to a machine and method for forming and applying carrying straps to article cartons.

BACKGROUND ART

U.S. Pat. No. 4,237,673 issued Dec. 9, 1980 and owned by the assignee of this invention discloses a machine for loading groups of primary packages such as bottles through the open ends of sleeve type cartons. The apparatus as disclosed and claimed in U.S. Pat. No. 4,237,673 does not provide means for forming carrying straps from plastic material and for applying those carrying straps to sleeve type cartons as contemplated by this invention.

DISCLOSURE OF INVENTION

A machine and method for forming and applying carrying straps to cartons according to one form of this invention provide for measuring a predetermined length of plastic strip, forming a loop from said plastic strip with overlapping ends, securing said overlapping ends together to form an endless strap, applying said strap in enveloping relation to at least some articles of a group of articles, inserting said group of articles into an open ended sleeve type carton having end flaps at least some of which are apertured to expose a part of said strap, closing said end flaps, and securing said end flaps in closed condition.

BEST MODE OF CARRYING OUT THE INVENTION

Figures 5, 7:
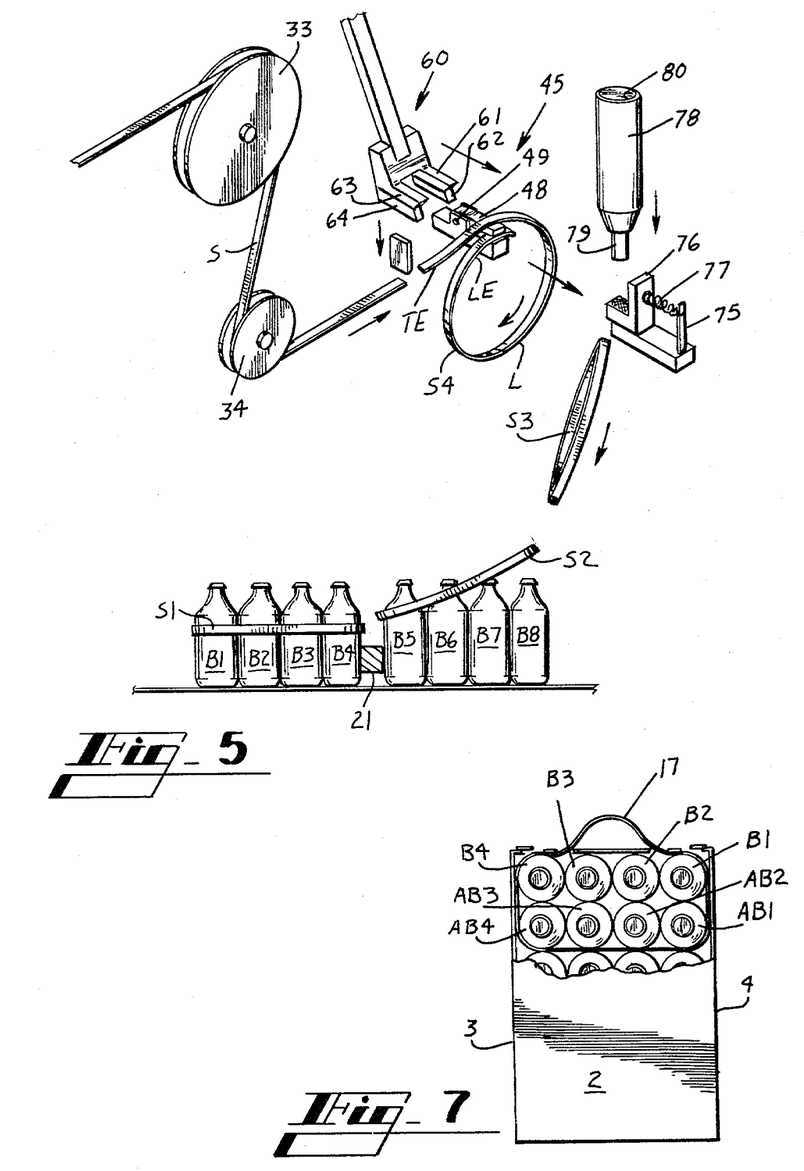
FIG. 5 is an exploded schematic view somewhat in perspective which shows some of the essential elements of a machine formed according to this invention.
FIG. 7 is a view of the bottom of FIG. 6 which is partially broken away to show a carrying strap applied to the carton of FIG. 6 but with the carrying strap shown in carrying position.
Figure 6:
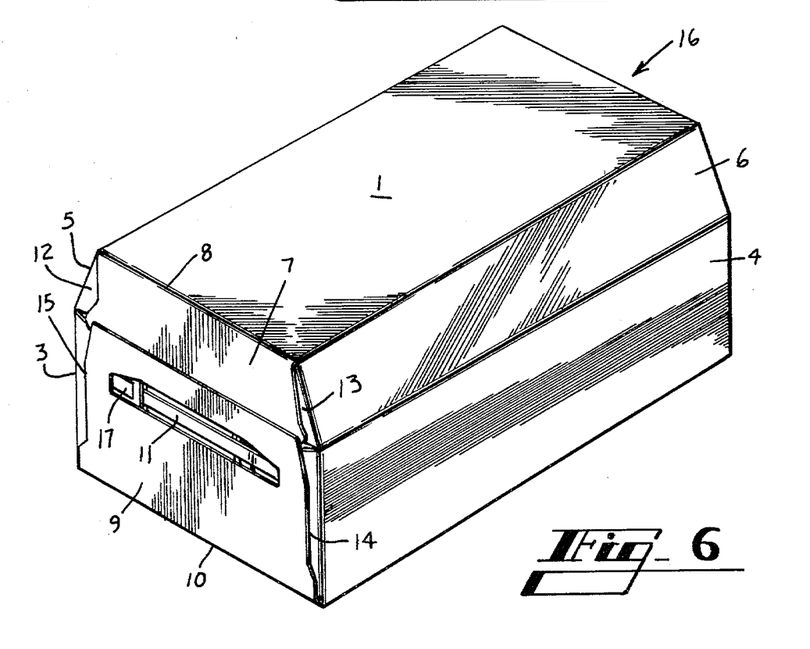
FIG. 6 is a perspective view of a carton to which carrying straps formed according to this invention have been applied and in which the carton is depicted in finished closed condition.

With reference to FIGS. 6 and 7, a carton is shown having a top wall 1, bottom wall 2, lower side wall panels 3 and 4 and sloping shoulder panels 5 and 6. An upper end flap 7 is foldably joined to the end edge 8 of top wall 1 while lower end flap 9 is foldably joined to bottom wall 2 along fold line 10. End flap 9 is arranged so that its upper edge overlaps the lower edge of end flap 7 and is provided with a slot 11. End flaps 12 and 13 are foldably joined to the end edges of sloping side wall sections 5 and 6 respectively and similar end flaps 14 and 15 are foldably joined to the end edges of lower side wall sections 4 and 5 respectively. The opposite end of the carrier is of similar construction except that slot 11 is omitted and is generally designated by the numeral 16 but is not shown in detail either in FIG. 6 or 7.

FIG. 7 shows the carton of FIG. 6 resting on its end 16 and with the carrying strap 17 disposed in its carrying position whereas in FIG. 6 the carrying strap 17 is shown behind the slot 11. The carrying strap 17 is arranged so as to envelop a number of bottles which are effectively retained within the carton due to the fact that the overlapping parts of the various end flaps are secured together in flat face contacting relation so that a lifting force imparted to carrying strap 17 results in elevation of the carrier and its contents.

The details of construction of the carton are more fully disclosed in U.S. Pat. No. 4,295,598 issued Oct. 20, 1981 and owned by the assignee of the invention.

Figure 1:
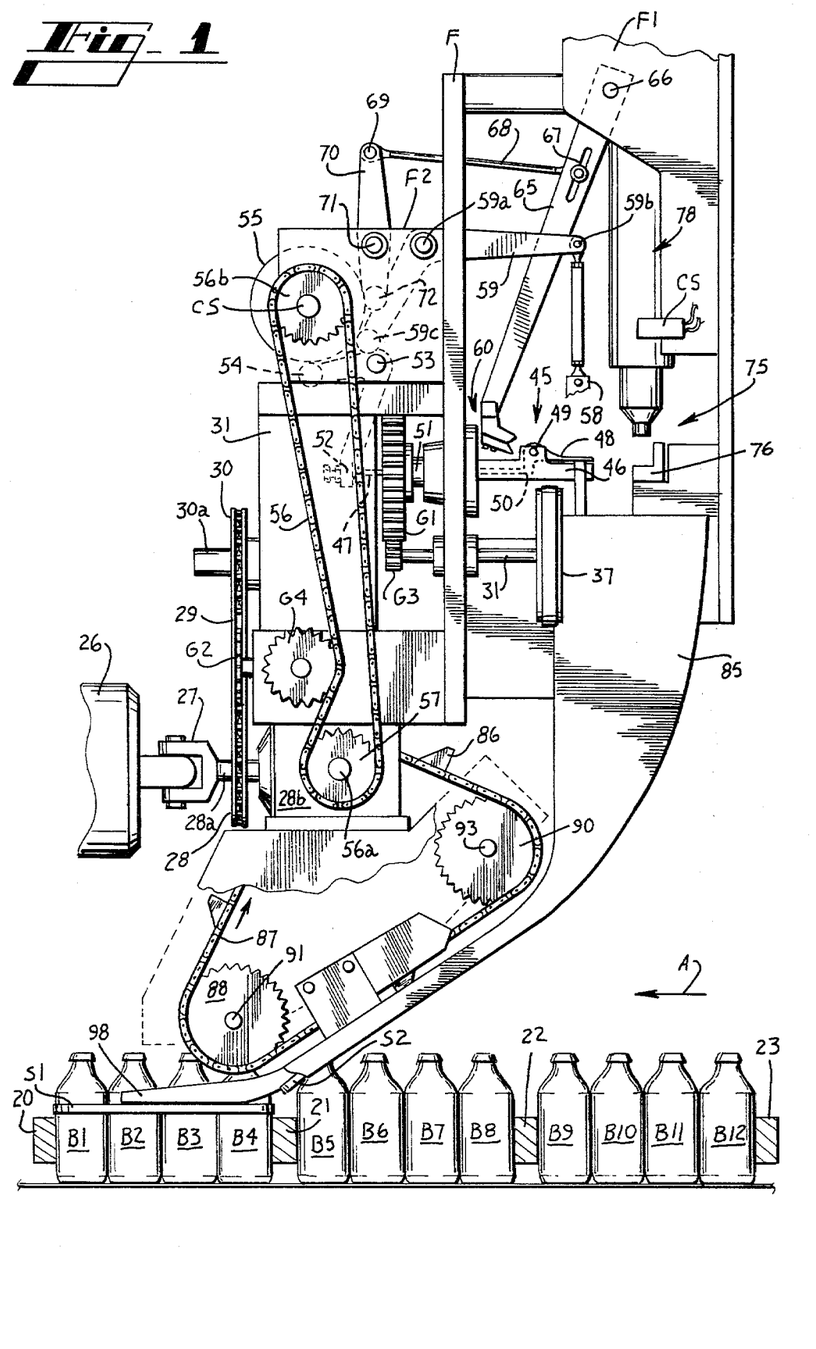
FIG. 1 is a side view of a machine for forming endless carrying straps and for applying those straps in sequence to groups of articles.

With reference to FIG. 1 a row of four bottles designated B1, B2, B3 and B4 is shown as following a machine flight bar designated by the numeral 20 and followed by a succeeding flight bar 21. While this invention is not limited for use in conjunction with any particular number of rows of bottles or to any particular number of bottles in a row, preferably four bottles such as B1-B4 are arranged in a row alongside one or more similar rows of four bottles each such as three rows. These rows of bottles are loaded into the open end of a sleeve type carton. The carton carrying strap formed and applied to a group of articles according to this invention is primarily intended for use in conjunction with a machine as disclosed and claimed in U.S. Pat. No. 4,237,673. As is apparent from FIG. 1 the bottles B1-B12 are moved from right to left as indicated by the arrow A. A carrying strap S1 is shown after having been applied to the group of bottles B1-B4 while a succeeding carrying strap designated S2 is shown with its end portion in partial enveloping relation with respect to the neck of bottle B5. As motion of the flight bars 20, 21, 22 and 23 continues, strap S2 envelopes bottles B5, B6, B7 and B8 while a succeeding strap envelopes bottles B9, B10, B11 and B12. It will be understood that another one or more rows of bottles may be disposed behind bottles B1-B4 and bottles B5-B8 as well as bottles B9-B12 as viewed in FIG. 1. Furthermore as is suggested in FIG. 7 the straps such as S1 and S2 envelop two rows of bottles. The row behind B1-B4 is designated in FIG. 7 as AB1-AB4.

Figure 4:
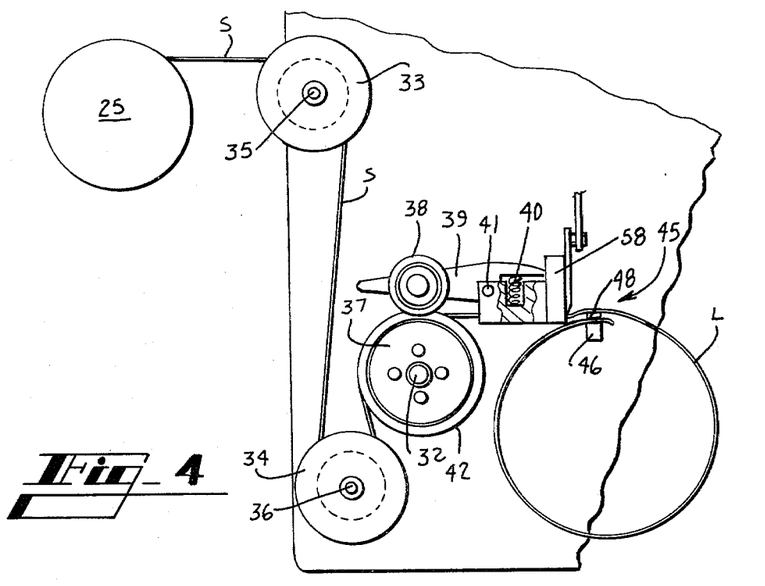
FIG. 4 is a somewhat schematic view taken along the line designated 4—4 in FIG. 3.

The carrying straps such as S1, S2 and S3 and S4 are formed from a supply of strip material indicated schematically in FIG. 4 by the numeral 25.

Figure 2:
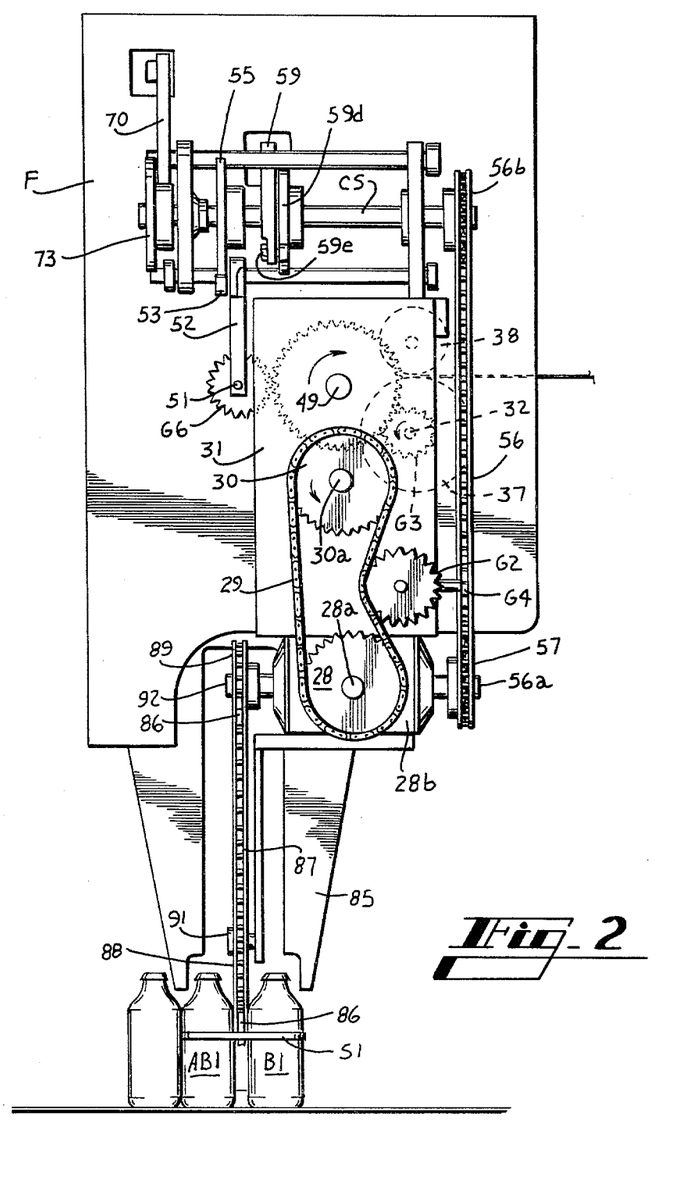
FIG. 2 is a front view from the left of the machine shown in FIG. 1.
Figure 3:
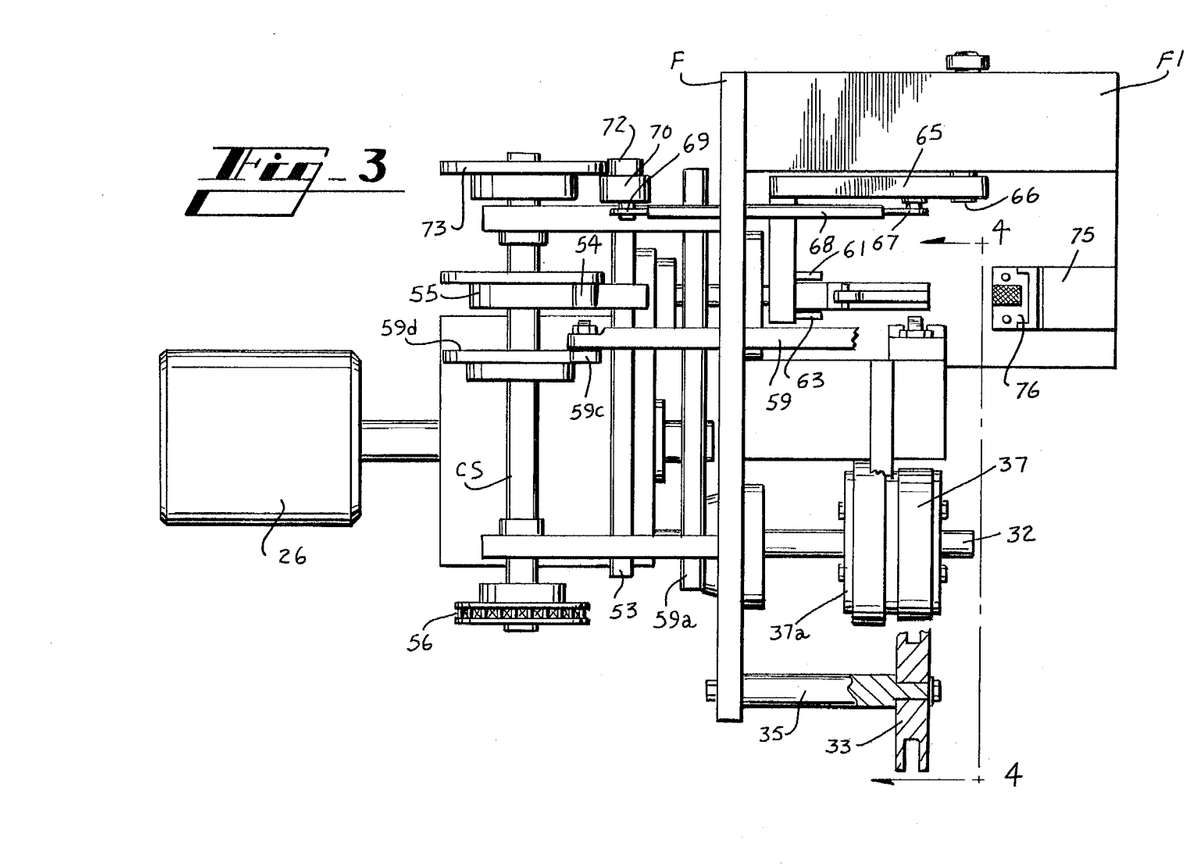
FIG. 3 is a top view of the machine shown in FIGS. 1 and 2.

The means for measuring predetermined lengths of strips as shown in FIG. 4 is driven by mechanism best shown in FIGS. 1 and 2. As is apparent in these drawings, a rotatable drive shaft 26 is arranged to impart rotary motion through coupling 27 to sprocket 28 which by means of chain 29 imparts rotary motion to sprocket 30. Sprocket 28 is securely affixed to and rotatable with shaft 28a while sprocket 30 is secured to and rotatable with shaft 30a. Gear G2 is an idler gear. Shaft 30a is arranged to drive the mechanism designated by the numeral 31. Mechanism 31 is a well known indexing device and is arranged to receive a power input via the continuously rotating sprocket 30 and its shaft 30a and is also arranged so as to provide intermittent rotation to output shaft 32 via gears G1 and G3 best shown in FIGS. 1, 2 and 4. Thus shaft 32 is arranged so as to rotate during a part only of each rotation of input shaft 30a.

As is best shown in FIG. 4, a supply of strip material S from source 25 is fed over idler roll 33 and around idler roll 34 which are mounted on shafts 35 and 36 secured to the frame plate F of the machine so that a supply of strip material S is fed between disc 37 and follower roll 38 which is biased by arm 39 and compression spring 40 about pivot 41 into firm engagement with the roller 37 the periphery of which is constructed of rubber or other resilient high friction material designated by the numeral 42. The diameter of disc 37 including its high friction periphery 42 together with the angular displacement of disc 37 about its shaft 32 during each full rotation of input shaft 30a determines the linear length of strip material S which passes between the points of peripheral tangential contact between pressure roll 38 and measuring roll 37. The roll 37 may be interchanged with a smaller or a larger roll by simply replacing the roll 37 from the shaft 32 or by moving the roll axially along the shaft 32 so as to bring a roll of different size into tangential contact with the pressure roll 38 and by this means a different length of strip S is measured for each increment of movement of the measuring roll 37.

A loop is formed by strip looping means generally designated by the numeral 45. As is best shown in FIGS. 1 and 4, the strip looping 45 means includes a lower jaw member 46 secured to rotatable shaft 51 which is journally supported by support plate F. Shaft 51 is driven intermittently by gears G6 and G1 of index mechanism 31 and like shaft 32 rotates a partial revolution for each revolution of input shaft 30a as is well known. As is best shown in FIGS. 1 and 5 strip looping means 45 also includes an upper jaw 48 pivoted at 49 to lower jaw 46. Upper jaw 48 is provided with a downwardly extending projection 50 which is engaged by a reciprocable pin 51 slidably mounted within shaft 47. As is best shown in FIG. 1 the left hand end of pin 51 is engageable by a cam 52 pivoted at fixed pivot 53 mounted on plate F and having a cam roller 54 which rides along the cam surface of cam 55. Cam 55 is mounted on cam shaft CS and is driven by chain 56 which in turn is driven by gear box 28b and its associated output shaft 56a and sprocket 57 through the agency of sprocket 56b. Gear G4 is an idler gear.

From the description above it is apparent that the strip looping means 45 rotates by virtue of being mounted on rotatable shaft 51 and that the upper jaw 48 of strip looping means 45 swings to an upper open position by virtue of the action of reciprocable rod 51, cam operating device 52, cam roller 54, rotatable cam 55 and mechanism associated therewith.

With the upper jaws 46 and 48 of strip looping means 45 in the open position as shown in FIG. 5, the leading end LE of a strip is inserted between the upper jaw 48 and the lower jaw 46. Continued rotation of cam 55 allows upper jaw 48 to close due to spring action not well shown in the drawings but which is of conventional helical construction and which is disposed about the pivot pin 49. This action allows the upper jaw 48 to grip the leading end LE of strip S a short time after the jaws 46 and 48 have rotated a few degrees from the normal upright position in a clockwise direction as viewed in FIG. 5. Thus with the leading end LE of the strip S firmly gripped within the jaws 48 and 46, rotation through 360° of the strip looping means 45 and with the leading end LE of the strip such as S4 gripped between the jaws 48 and 46 allows the trailing end TE of the strip to lie atop the upper jaw 48 so that the parts then occupy the positions best shown in FIG. 5. From FIG. 5 it is apparent that the loop L is arranged with its leading end LE in overlapping relationship underneath the trailing end TE and that the trailing end is disposed above the upper jaw 48.

After the trailing end of loop L is caused to occupy the looped position indicated in FIG. 5, it must be severed by severing means 58 which is operated vertically in synchronism with the machine by means of crank 59 pivoted at 59 to frame part F2 and at 59b to severing means 58 by virtue of cam roller 59e which cooperates with cam 59d.

For gripping the loop L at its overlapped end portions and for transferring the loop to suitable securing means, holding means 60 is provided. As is best shown in FIG. 5 holding means 60 includes a cooperating pair of fingers 61 and 62 and a laterally spaced pair of cooperating fingers 63 and 64. These two pairs of fingers are spaced laterally apart and thus when swung toward the right as viewed in FIG. 1, for example, fingers 61 and 62 are disposed on one side of strip looping means 45 while the fingers 63 and 64 are disposed on the other side of strip looping means 45. Thus the fingers 61 and 62 when moved toward the right envelope the overlapped portion of the ends of the loop L on one side of strip looping means 45 while the fingers 63 and 64 envelope the overlapped ends of loop L on the opposite side of strip looping means 45.

Holding means 60 is moved from left to right and vice versa by virtue of its mounting on arm 65 which is pivoted at pin 66 on frame part F1 and which is pivotally connected at 67 with a link 68 which in turn is pivoted at 69 with a crank 70 which in turn is pivoted at 71 to the frame part F2 of the machine. Crank 70 is provided with a cam roller 72 which cooperates with cam 73 affixed to cam shaft CS so that rotation of cam 73 imparts synchronous to and fro oscillatory motion to link 65 about pivot pin 66 as a center.

When holding means 60 is moved from its left hand position as shown in FIG. 1 toward the right as shown in FIG. 1 the loop L is removed from strip looping means 45 and transferred to support 75 on which ejector element 76 is slidably mounted and spring biased toward the left by spring 77 as best shown in FIG. 5. With the overlapped ends of loop L disposed atop the ejector element 76 of support 75, sonic welding device 78 is lowered in response to engagement of arm 65 with control switch CS by suitable pneumatic means within its cylinder 80 so that its welding head 79 contacts the overlapping ends of loop L and in known manner effectively welds and secures these overlapping ends in secure face contacting relation relative to each other. After the welding operation is complete, sonic welder 78 is moved upwardly by pneumatic means within its upper cylinder 80 and the finished strap 5 is automatically ejected by ejector 76 and allowed to fall downwardly through positions indicated at S3, S2 and S1 as shown in FIG. 5. Welder 78 is a Branson ultrasonic welder model 186P. As used herein the sonic welder 78 is sometimes referred to as securing means.

After the strap is completed and ejected by ejector 76, by free fall it is dropped into the chute 85 which is disposed immediately below the ejector 76. As a finished strap slides downwardly through chute 85, it is engaged by pusher elements 86 on conveyor 87 which is supported by sprockets 88, 89 and 90 which in turn are rotatably mounted on shafts 91, 92, and 93. Thus a pusher element such as 86 engages the interior of a strap such as S3 and drives that strap in synchronism with the machine down through the lower end of chute 85 and to the position S2 with the leading end such as S2 LE in overlying relationship with respect to bottle B5 as best shown in FIG. 1. Of course this action is efficiently achieved because the strap making and manipulating mechanism described above is driven in synchronism with the packaging machine comprising flight bars 20–23 and associated parts. Continued movement of the bottles B5–B8 and the associated group of bottles therebehind as viewed in FIG. 1 brings these bottles to the position represented at B1–B4 at which presser bar 98 pushes the strap S1 down between the two rows of bottles and onto the flight bars 20 and 21. With the strap thus enveloping two rows of bottles as represented in FIG. 7, it is then simply necessary to move the bottles such as B1–B4 and the remaining row or rows of bottles therebehind inwardly through the open end of a carton such as is shown in FIGS. 6 and 7 and thereafter by suitable known means as disclosed in U.S. Pat. No. 4,237,673 to close the end flaps of the carton so that the carton then appears as shown in FIG. 6.

Closure of the end flaps of the carton simply envelopes the loop such as 17 inside the carton but with a portion thereof which is in coincidence with the slot 17 exposed. Thus the carrying loop 17 may simply be grasped by the user's fingers and pulled outwardly so as to cause the carrying loop to occupy the position indicated in FIG. 7.

Figure 8:
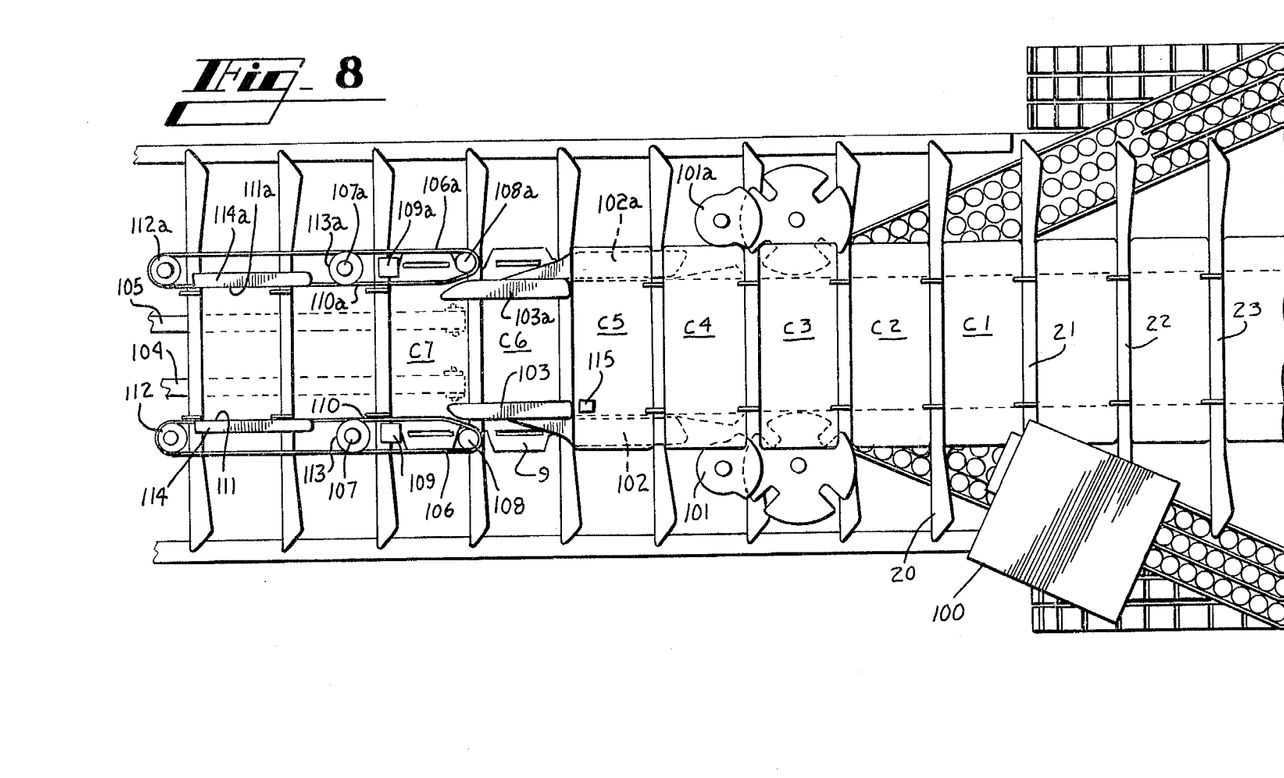
FIG. 8 is a plan view of a packaging machine showing the machine of FIGS. 1-5 mounted thereon.

The strap forming and applying machine as shown in FIGS. 1–4 is indicated schematically in FIG. 8 by the block indicated at the numeral 100. The strap forming and applying machine 100 of course is supported by suitable brackets on the frame of the packaging machine shown in FIG. 8. With the bottles B1–B4 and the bottles AB1–AB4 surrounded by strap S1 as indicated in FIG. 1, these two rows of bottles together with a third row of bottles are guided into an open end of a sleeve type carton as indicated in FIG. 8 at positions C1 and C2. These open ended sleeve type cartons are respectively pushed along toward the left as viewed in FIG. 8 by the flight bars 20 and 21. When position C3 is reached, the rotatable element W1 engages the bottles B1, B2, B3 and B4 and pushes those articles together with the two rows of bottles already inside the carton into their final positions at location C3. Element W1 is of known construction.

For the purpose of folding the trailing side wall end flaps 13 and 14 generally toward the left, the folding element 101 mounted on shaft 102 is employed. Subsequently static bar 102 engages the leading side wall end flaps 12 and 15 and folds those flaps backwardly and toward their closed positions. Thereafter static top end flap folder 103 engages top end flap 7 and folds that flap downwardly toward closed position substantially as shown in FIG. 6. Thereafter the bottom of the carton is engaged by endless belts 104 and 105 and cause the carton to move to the position indicated at C7 at which the bottom end flap 9 is disposed in a horizontal position. For holding the top end flaps 7 and the side wall end flaps 12, 15, 13 and 14 in closed condition, belts 106 rotatable about driving sprocket 107 and idler sprocket 108 are provided. With the flap 9 disposed horizontally and moving underneath glue applicator 109, two strips of glue are applied on opposite sides of the slot 11. Of course the glue applicator 109 is disposed at a level above the flap 9.

After this application of glue is made, end flap 9 is engaged by static guide 110 and is plowed upwardly and into contact with end flap 7 and with end flaps 12, 15, 13 and 14. The bottom end flap 9 is held in its closed condition by belt 111 which is endless and which is driven by driving sprocket 112 and idler sprocket 113. A pressure plate 114 is disposed behind the working reach 115 of endless belt 111 so as to impart a force to the end flaps which insures that a secure bond is formed between the glued end flaps 9 and 7 and at least some of the remaining end flaps such as 14 and 15.

During closure of this end of the carton, strap 17 is captured within the end flaps and is brushed backwardly by static guide 115 prior to the initiation of folding of the end flaps such as 12 and 15. The strap 17 is doubled back on itself and disposed immediately behind the slot 11 as is more fully disclosed in U.S. Pat. No. 4,295,958.

The end 16 of the carton is of a construction which is identical to the opposite end except for the fact that the slot 11 is omitted. The machine parts are substantially identical except that the static element 115 is not required. The subscript "a" is added to machine parts which close end 16 of the carton.

With the strap in the position indicated in FIG. 6 it may be removed and pulled into the position represented in FIG. 7 by simply manually grasping the exposed surface of the strap.

INDUSTRIAL APPLICABILITY

A machine and method according to this invention are well suited for use in conjunction with the formation of secondary packages containing a large number of primary packages of consumer items because the carrying strap formed according to this invention and applied to cartons of this type is particularly sturdy and reliable.

I claim:

1. A machine for forming an endless strap from a supply of strip material, said machine comprising adjustable strip measuring means for supplying a strip of predetermined length from said supply of strip material, strip looping means including a pair of biased closed jaws which are opened by synchronous cam operated means for receiving said strip from said strip measuring means and for gripping said strip near the leading end thereof, motive means for rotating said strip looping means in a direction such that the trailing end of said strip overlaps said leading end thereof thereby forming a loop, pivotally mounted holding means arranged to straddle said strip looping means so as to engage said overlapped ends of said strip at spaced points therealong for engaging and holding said overlapped ends in face contacting relation and means for pivoting said holding means for bodily moving said loop strip and for removing said overlapped ends from said strip looping means, means for severing said strip at the trailing end thereof from said supply of strip material, and securing means arranged to receive said overlapped ends from said pivoted holding means and for attaching said overlapped ends of said strip together to form an endless strap.

2. A machine according to claim 1 wherein said strip measuring means is intermittently operable.

3. A machine according to claim 1 wherein said holding means comprises cooperating fingers which engage said overlapped ends of said strip and hold said overlapped ends in face contacting relation.

4. A machine according to claim 1 wherein said securing means includes a support on which said overlapped ends of said strip are positioned by said holding means.

5. A machine according to claim 1 wherein said supply of strip material is formed of plastic material and wherein said overlapped ends of said strip are secured together by sonic welding means to form an endless strap.

6. A machine according to claim 4 wherein said support includes an ejector element for discharging a finished strap from said support.

7. A machine according to claim 1 wherein a discharge chute is disposed to receive a finished strap by gravity fall.

8. A machine according to claim 1 wherein synchronous conveyor means is arranged to receive a finished strap and to convey it to a point of use.

9. A method of forming an endless strap from a supply of strip material said method comprising the steps of withdrawing and measuring a strip of predetermined length from said supply of strip material, gripping and rotating the leading end of said strip in a direction to form a loop and to cause the trailing end thereof to overlap the leading end thereof, gripping said overlapped ends of said strip by a holding means, severing the trailing end thereof from said supply of strip material, moving said holding means to bodily move said looped strip by moving said gripped overlapped ends to a means for securing said overlapped ends together following severance of the trailing end of said strip from said source of strip material and securing said overlapped ends of said strip together in face contacting relation to form an endless strap.

10. A machine for forming an endless strap from a supply of strip material, said machine comprising strip measuring means for supplying a strip of predetermined length from said supply of strip material, strip looping means for receiving said strip from said strip measuring means and for gripping said strip near the leading end thereof, motive means for rotating said strip looping means in a direction such that the trailing end of said strip overlaps said leading end thereof thereby forming a loop, securing means for attaching said overlapped ends of said strip together to form an endless strap, holding means supported on pivotally mounted means for holding said overlapped ends together and means for swinging said holding means between said strip looping means and said securing means and operable to bodily move said looped strip to transfer said overlapped ends of said strip from said strip looping means to said securing means, and means for severing said strip at the trailing end thereof from said supply of strip material.

11. A machine for forming an endless strap from a supply of strip material, said machine comprising strip measuring means for supplying a strip of predetermined length from said supply of strip material, strip looping means for receiving said strip from said strip measuring means and for gripping said strip near the leading end thereof, motive means for rotating said strip looping means in a direction such that the trailing end of said strip overlaps said leading end thereof thereby forming a loop, holding means for engaging and holding said overlapped ends in face contacting relation, means for severing said strip at the trailing end thereof from said supply of strip material, and securing means including a support on which said overlapped ends of said strip are positioned for attaching said overlapped ends of said strip together to form an endless strap, means for swinging said holding means between said strip looping means and said securing means and operable to bodily move said looped strip and to transfer said overlapped ends of said strip from the said strip looping means to said securing means, and an ejector element mounted on said support and biased toward a strap ejecting position for discharging a finished strap therefrom and moveable by said holding means to a position at which said overlapped ends of said strip are secured together to form an endless strap.

* * * * *